Nov. 17, 1936.  W. M. HOLLERBACH  2,060,867
COMBINATION EXCAVATOR, LOADER, AND CONVEYER
Filed Oct. 13, 1934  5 Sheets-Sheet 1

Inventor:
Walter M. Hollerbach.
By G. H. Braddock
Attorney.

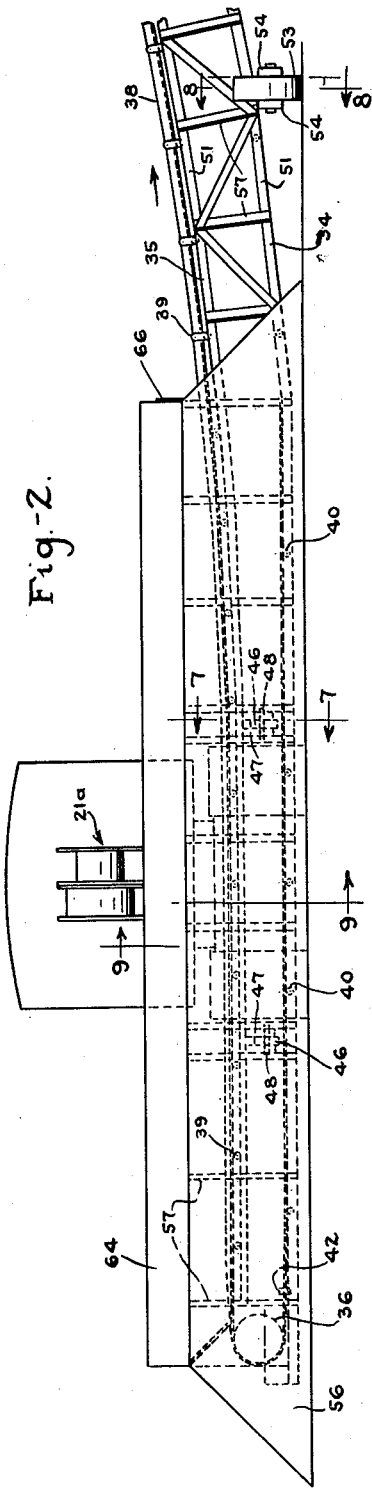
Nov. 17, 1936.   W. M. HOLLERBACH   2,060,867
COMBINATION EXCAVATOR, LOADER, AND CONVEYER
Filed Oct. 13, 1934   5 Sheets-Sheet 2
Inventor:
Walter M. Hollerbach
By G. H. Braddock
Attorney.

Nov. 17, 1936.   W. M. HOLLERBACH   2,060,867
COMBINATION EXCAVATOR, LOADER, AND CONVEYER
Filed Oct. 13, 1934    5 Sheets-Sheet 3
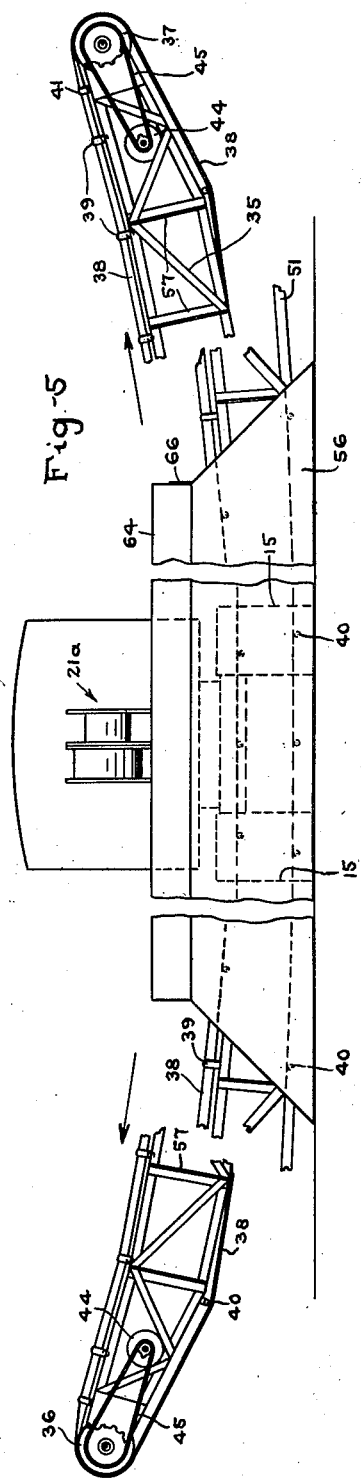
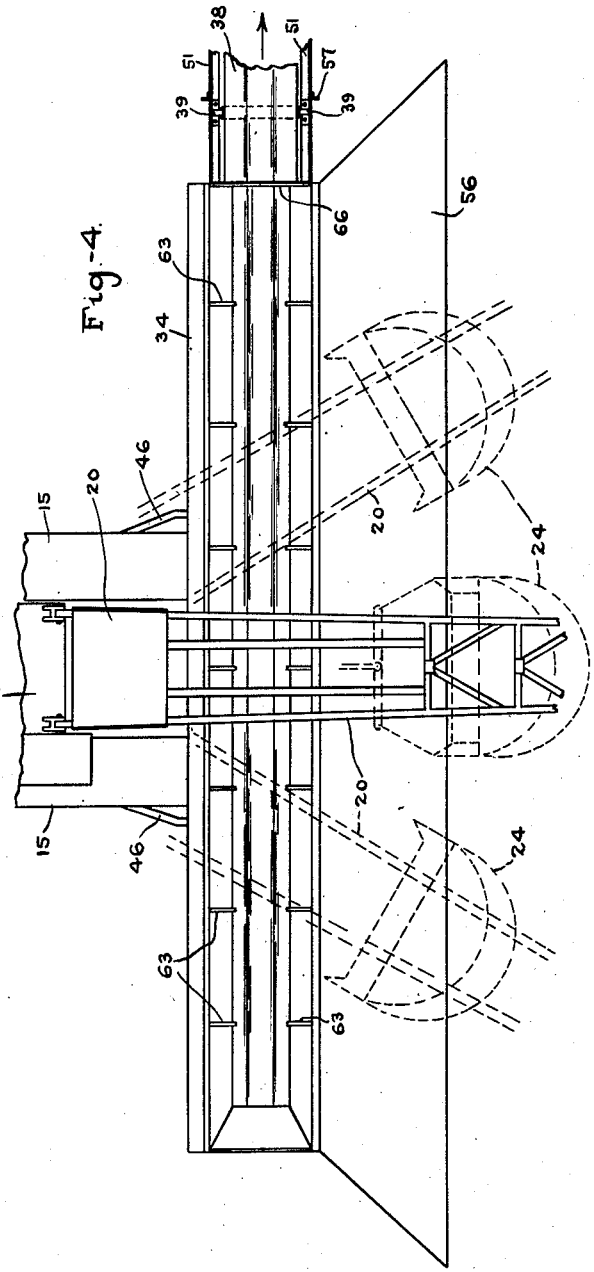
Inventor:
Walter M. Hollerbach
By G. H. Braddock
Attorney.

Nov. 17, 1936.  W. M. HOLLERBACH  2,060,867
COMBINATION EXCAVATOR, LOADER, AND CONVEYER
Filed Oct. 13, 1934  5 Sheets-Sheet 4
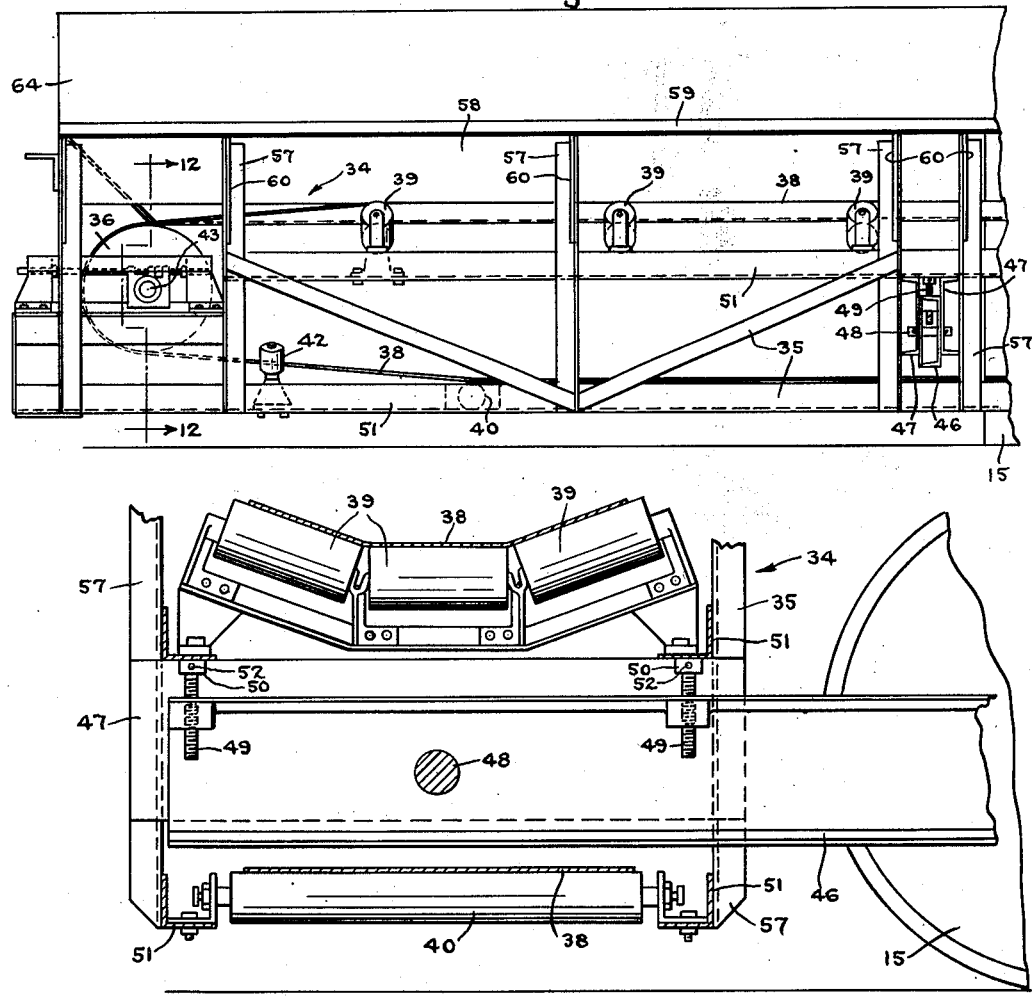
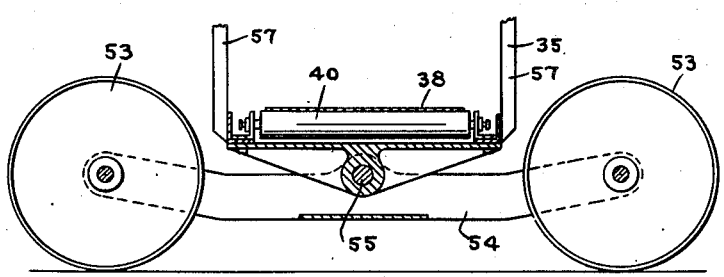
Inventor:
Walter M. Hollerbach
By G. H. Braddock
Attorney.

Nov. 17, 1936.    W. M. HOLLERBACH    2,060,867
COMBINATION EXCAVATOR, LOADER, AND CONVEYER
Filed Oct. 13, 1934    5 Sheets-Sheet 5
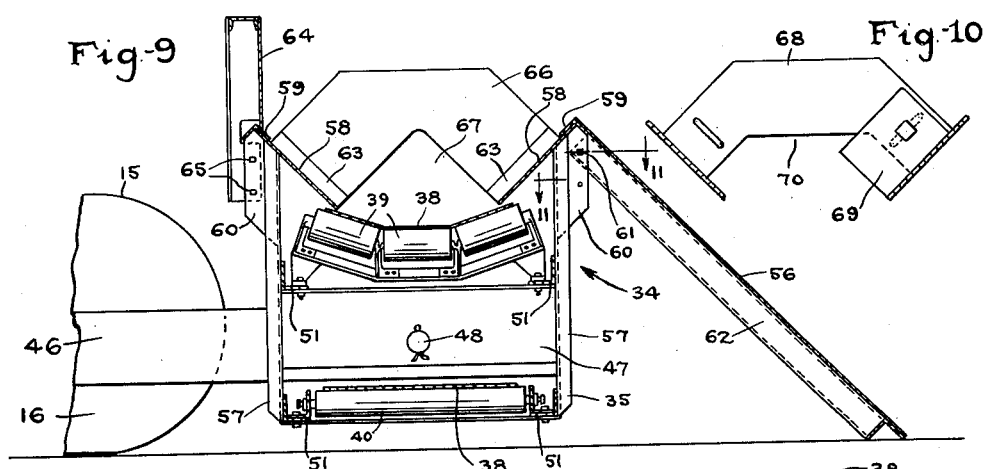
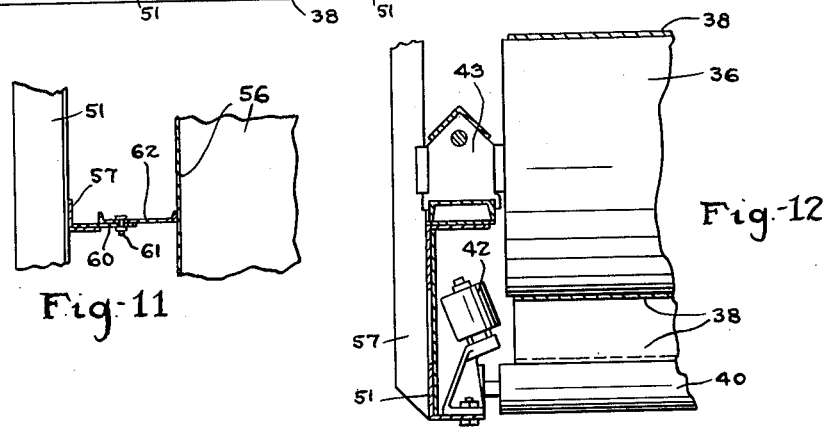
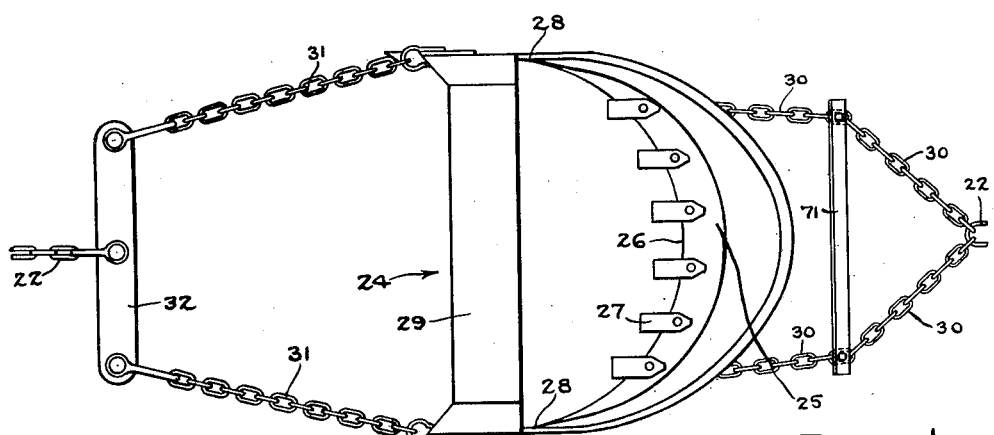
Inventor:
Walter M. Hollerbach.
By G. H. Braddock
Attorney Patented Nov. 17, 1936

2,060,867

UNITED STATES PATENT OFFICE 2,060,867

COMBINATION EXCAVATOR, LOADER, AND CONVEYER

Walter M. Hollerbach, St. Paul, Minn., assignor to American Hoist and Derrick Company, St. Paul, Minn., a corporation of Delaware Application October 13, 1934, Serial No. 748,233

19 Claims. (Cl. 214—93)

This invention relates to a machine for excavating, moving, or handling material, such as dirt, sand, gravel, or any other material, and for loading the excavated, moved, or handled material upon a conveyer adapted to transport the material loaded thereon to selected and predetermined location.

The general object of the invention is to provide a machine for excavating, moving or handling material wherein will be incorporated various improved features and characteristics of construction novel both as individual entities of the machine and in combination.

A further object is to provide a combination excavator and loader having means for excavating, moving or handling material, and for loading the excavated, moved or handled material at selected location in novel and improved manner.

A further object is to provide a combination excavator, loader and conveyer having means for removing material from the ground, or other surface, and for loading the removed material upon, or delivering the removed material to, a conveyer therefor in novel and improved manner.

A further object is to provide a combination excavator, loader and conveyer consisting of entities associated together and arranged with respect to each other to attain more advantageous results than have heretofore been attained in the excavation, removal or handling of material and the delivery of said material to selected and predetermined location.

A further object is to provide a combination excavator and loader including an excavating, moving or handling entity for removing material from the ground or other support, and an entity for receiving the removed material, wherein said entities will bear relationship to each other designed to insure the removal of the material from the ground or other support and the loading of the removed material at an intended location by the expenditure of but a minimum in effort.

A further object is to provide a combination excavator, loader and conveyer including an entity for digging or dragging material from the ground or other support, and an entity for transporting the removed material to selected and predetermined location, wherein said digging or dragging entity will be constructed and will be arranged with respect to said transporting entity to be capable of removing the dug or dragged material from the ground and of delivering the removed material to, or loading said material upon, said transporting entity by the performance of a scraping operation.

A further object is to provide a combination excavator, loader and conveyer including a drag scraper for removing material from the ground by a scraping or dragging operation over the ground, and means for transporting the removed material to selected and predetermined location, wherein said drag scraper and said transporting means will be arranged relatively to each other and said transporting means will be of construction to render possible the loading of the material removed from the ground upon the transporting means by the same scraping or dragging operation which removed said material from the ground, or by a continuation of said scraping or dragging operation, whereby to preclude the necessity for at any time bodily lifting the removed material off of the ground.

A further object is to provide a combination excavator and loader which will include a scraping, dragging or digging entity, an entity for receiving material handled by said scraping, dragging or digging entity, and means for manipulating said scraping, dragging, or digging entity to cause it to drag or dig material from the ground or other support and at location below said material receiving entity and elevate said material by the performance of a scraping or dragging operation, and also to cause said scraping, dragging or digging entity to load the material, dragged or dug from the ground or other support and elevated, upon said material receiving entity by a continuation of said scraping or dragging operation.

A further object is to provide a combination excavator, loader and conveyer which will include a scraping, dragging or digging entity, a conveyer for transporting material excavated or removed from the ground or other support, and means including a boom and cables for manipulating said scraping, dragging or digging entity to cause it to drag or dig material from the ground or other support and at location below an elevation where the material is to be loaded for transportation and elevate said material by the performance of a scraping or dragging operation, and also to cause the scraping, dragging or digging entity to load the material, dragged or dug from the ground or other support and elevated, upon said conveyer by a continuation of said scraping or dragging operation.

A further object is to provide a combination excavator, loader and conveyer, wherein said excavator will include a shiftable boom, an open bottom type scraping entity, and means supported by the boom for manipulating said scraping entity, wherein said conveyer may desirably be situated beneath the boom, and wherein the means for manipulating the scraping entity will cause it to remove material from the ground, elevate said material and load it upon said conveyer, desirably at location below the boom when at any one of several positions to which the boom may be shifted, by the performance of a scraping or dragging operation upon the material.

A further object is to provide a combination excavator, loader and conveyer of the character as set forth which will include a conveyer of novel and improved construction.

And a further object is to provide in the combination excavator, loader and conveyer, an open bottom type, drag scraper of improved design.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the claims which follow.

In the accompanying drawings forming a part of this specification,

Fig. 2 is a front elevational view of the conveyer, parts being broken away and omitted, also disclosing a portion of the excavator;

Fig. 3 is a front elevational view of the conveyer, parts being broken away and omitted, showing a portion of said conveyer which is omitted from Fig. 2, and also disclosing a portion of the excavator;

Fig. 4 is a fragmentary plan view of the combination excavator, loader and conveyer;

Fig. 5 is a view corresponding generally with the disclosure of Fig. 3, but showing a conveyer of modified construction;

Fig. 6 is an enlarged fragmentary view disclosing an end portion of the conveyer in side elevation, with the apron or guide plate removed;

Fig. 7 is an enlarged sectional view, taken on line 7—7 in Fig. 2, detailing features of the conveyer and a manner of associating said conveyer with an excavator;

Fig. 8 is an enlarged sectional view, taken on line 8—8 in Fig. 2, detailing a manner of supporting the conveyer upon the ground;

Fig. 9 is an enlarged sectional view, taken on line 9—9 in Fig. 2, detailing additional features of the conveyer;

Fig. 10 is a view detailing a modified form of device for controlling transportation of material by the conveyer;

Fig. 11 is a detail sectional view, taken as on line 11—11 in Fig. 9;

Fig. 12 is an enlarged fragmentary sectional view, taken on line 12—12 in Fig. 6; and Fig. 13 is an enlarged plan view of the drag scraper of the excavator.

Figure 1:
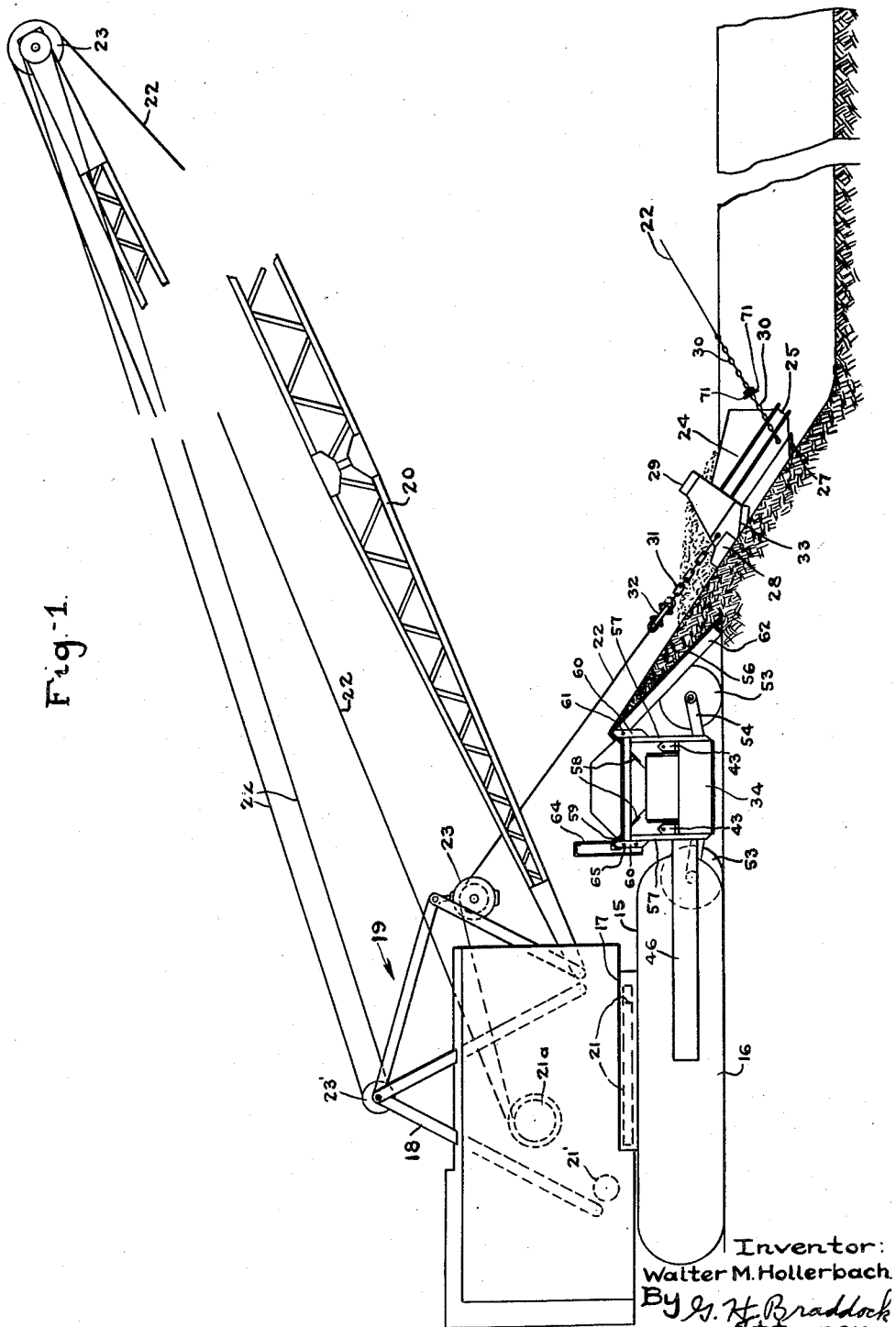
Fig. 1 is a side elevational view of a combination excavator, loader and conveyer in which the features of the invention are incorporated, parts being omitted and broken away.

With respect to the drawings and the numerals of reference thereon, the excavator may include a tractor, of ordinary or preferred design, having tracks 15 supported by a suitable frame, denoted generally at 16. As disclosed more clearly in Figs. 1 to 5, the frame 16 conveniently supports a revolvable platform 17 which in turn supports a back brace 18, a mast 19, a pivoted boom 20, and mechanism, represented generally at 21, 21' and 21ª, for properly revolving the platform, for controlling the boom, and for manipulating cables 22 ridable over pulleys 23 upon the mast structure and the outer end of the boom and controlling an open bottom type dragging or digging entity, indicated generally at 24. The mechanism 21' manipulates cables 22' ridable over pulleys 23' on the back brace and mast structure and associated with the boom.

The dragging or digging entity 24 is an open bottom type drag scraper shown more clearly in Figs. 1 and 13. Said drag scraper consists of a general crescent shape body 25 with forward curvilinear scraping edge 26 from which digging or cutting entities 27 extend forwardly. At the sides and forwardly of the scraping edge 26 there are spaced apart, parallel and vertical portions, denoted 28, of the drag scraper. A reinforcement member 29, extending between the portions 28 to fix their relation, is disposed in about the horizontal plane of the upper portion of the crescent shape body 25 to offer no interference to the proper operation of the drag scraper. Chains 30 which extend from the rear of the crescent shape body 25 include approximately parallel portions attached to the opposite ends of an equalizer bar 71 and converging portions attached to a pull-out cable of said cables 22. The equalizer bar 71 consists of a pair of angle pieces. Converging chains 31 are attached at their inner ends to the portions 28 and at their outer ends to the opposite end portions of an equalizer bar 32, and the midlength of said equalizer bar is attached to a pull-in cable of said cables 22. There is a digging or cutting entity 33 at the outer side of each portion 28. Obviously, by manipulation of the pull-out and pull-in cables 22, the drag scraper 24 is controlled to scrape, dig, or drag material from the ground, as will be very clear by reference to the disclosure of Fig. 1 of the drawings.

The conveyer, denoted generally at 34, and the drag scraper 24 are associated and related to render possible the loading of the material removed from the ground upon said conveyer by the same scraping or dragging operation which caused said drag scraper to remove the material from the ground, or, as it might be more properly stated, by a continuation of said scraping or dragging operation, and without lifting the removed material clear of the ground. As disclosed, said conveyer consists of a suitable frame 35 with pulleys 36 and 37 conveniently mounted in transverse bearings at the opposite ends of said frame, a conveyer belt 38 riding over said pulleys, upper and lower supporting rollers, denoted 39 and 40, respectively, for said conveyer belt, and upper and lower guide rollers, denoted 41 and 42, respectively, for the belt. All of the rollers 39, 40, 41 and 42 are supported by the frame 35. The pulley 36 has adjustable bearings 43, shown more clearly in Figs. 6 and 12, whereby the tension on the conveyer belt may be properly adjusted. A motor 44, suitably carried by the frame 35, is connected, as by a belt or sprocket 45, to drive the pulley 37 to advance the conveyer belt in the direction indicated in the drawings.

As disclosed, the conveyer is situated directly in front of the tractor of the excavator, beneath the boom, and extends transversely of said tractor. See Figs. 1 to 4. Desirably, the conveyer may be detachably supported upon the tractor or excavator. As shown more clearly in Figs. 1, 2, 4, 6, 7, and 9, the tractor frame 16 rigidly carries forwardly extending, spaced apart supports, denoted 46, 46, each of which is disposed between a set of spaced apart channel members 47, 47 on the frame 35, there being two sets of spaced apart channel members 47, 47, one positioned at each side of the tractor and forwardly thereof. The channel members 47, 47 extend transversely of the conveyer at location between the upper and lower rollers 39 and 40, and are welded or otherwise secured to the frame 35. A pin 48 extends through openings in each set of channel members 47, 47 and the corresponding support 46, to oscillatably mount the conveyer for sidewise swinging movement. The pins 48 extend longitudinally of the conveyer and are desirably at the midwidth of said conveyer. Each support 46 carries a pair of vertically adjustable screw jacks 49, including a screw jack at the inner side and a screw jack at the outer side of the conveyer, that is, at opposite sides of the pins 48. The heads 50 of the screw jacks 49 support angle pieces 51 welded or otherwise secured to the frame 35 at the inner and outer sides of said frame and extending longitudinally of the conveyer. Said angle pieces 51 are preferably not connected to the screw jacks, but instead merely rest thereon. Obviously, by rotation of the screw jacks 49, the conveyer can be rocked or swung sidewise upon the pins 48 as a longitudinal axis for said conveyer and thus levelled. Openings 52 in the heads 50 of the screw jacks are for the purpose of allowing the insertion of a suitable tool for rotating said screw jacks. It will be evident that the pins 48 constitute the only connecting means between the tractor supports 46 and the conveyer, and that said conveyer can be separated from the tractor by removing said pins and withdrawing said supports 46 from between the channel members 47, 47.

Wheels 53, at location spaced from the supports 46 and adjacent the delivery end of the conveyer, are for the purpose of supporting said conveyer upon the ground. As shown more clearly in Figs. 1, 2, 3 and 8, a wheel carrying lever 54, which extends transversely of the conveyer, has its midlength pivoted, as at 55, to said conveyer on a longitudinal axis in the vertical plane of the pins 48. It will be apparent that levelling adjustment of the conveyer by vertical movement of the screw jacks 49 will cause said conveyer to also rock on the pivot pin 55 as an axis.

The conveyer conveniently supports an apron or guide plate 56 which extends along said conveyer to terminate at either side of the tractor in spaced relation thereto. The apron or guide plate directs the scraped or dragged material to the conveyer and additionally serves as a guard to keep the material from fouling the conveyer. The frame 35 includes uprights 57 at either side thereof spaced along the length of the conveyer. Said uprights 57 extend to position above the plane of the conveyer belt 38, and longitudinally disposed, material directing members 58 are welded or otherwise secured to said uprights to extend downwardly and inwardly. Each member 58 terminates at location just within the adjacent side margin of the conveyer belt, as will be more clear from Fig. 9. Said members 58 are as disclosed of length equal to the length of the apron or guide plate 56. Desirably, the upper edge of each member 58 carries an angle bar 59 extending the length of said member. The ends of the members 58 and the apron or guide plate 56 terminate flush with each other. The uprights 57 integrally support attachment pieces 60 which are beneath the angle bars 59. The apron or guide plate 56 is at the forward side of the conveyer, and its upper edge overlaps the adjacent angle bar 59. Said apron or guide plate extends downwardly and outwardly at about a 45° angle, and has its lower edge supported upon the ground. Screw bolts 61 removably fasten reinforcement members 62 upon the apron or guide plate 56 to adjacent attachment pieces 60. Spaced apart material separators 63 project upwardly from the members 58. A guard member 64 at the rearward side of the conveyer, which guard member extends longitudinally of said conveyer and upwardly above the members 58, is removably fastened to attachment pieces 60 opposite the apron or guide plate, as by screw bolts 65. It will be obvious that by making the conveyer detachable from the apron or guide plate 56 and the guard member 64, said conveyer can be reversed, that is, turned end for end, to deliver the material at either side of the excavator, as may in a particular instance be preferred.

In Fig. 5 there is disclosed a conveyer similar to the conveyer described and for a similar purpose, but adapted to deliver material in either direction from the excavator. In the present embodiment of the invention, there are two motors 44 each with belt or sprocket 45, one motor being adapted to drive the conveyer belt in direction opposite that in which the other motor drives said conveyer belt. Of course only one motor will be at any time operating. As disclosed, the conveyer of Fig. 5 extends beyond both ends of the apron or guide plate.

A plate 66, shown more clearly in Fig. 9, is weided or otherwise attached to the members 58 at their delivery ends to provide a passageway 67 above the conveyer belt for limiting the quantity of material which will be delivered by said conveyer belt, as will be understood.

In Fig. 10, the plate 68, for the same purpose as the plate 66, adjustably supports members 69 for controlling a passageway 70, for the same purpose as the passageway 67.

Attention is called to the fact that the conveyer 34 need not necessarily be at the location shown, nor need said conveyer be supported by the tractor, or other part of an excavator, portable or stationary, included as an element of the invention and employing no tractor.

It will be evident that the drag scraper 24 can be manipulated by the pull-in and pull-out cables 22 to load material removed from the ground or other support upon the conveyer by a continuation of the same scraping or dragging operation which caused the drag scraper to remove the material from the ground or other support, and without lifting the material from the ground or other support. The scraper may be of construction considerably different from the disclosure as made. Evidently, all of the material scraped or dragged by the scraper goes onto the conveyer belt, including the material in front of the scraper. The apron or guide plate 56 directs the material to the conveyer as the material is scraped or dragged from the ground or other means supporting the material just to the front of said apron or guide plate. In some instances where an element such as 56, or equivalent, may not be employed, the scraping or dragging of the material onto the conveyer, or other means to receive the material, will yet be over the ground or other support immediately in front of the conveyer.

It will be obvious that the arrangement as illustrated and described for removing material from the ground or other supporting means for the material and for loading the removed material upon a conveyer adapted to transport the material to a selected and predetermined location is a vast improvement over arrangements heretofore known for excavating, moving or handling and conveying material. Inasmuch as the material is not at any time bodily lifted off of the ground or other natural support for the material, it is removed and loaded upon a conveyer by expenditure of a smaller amount of effort than has heretofore been the case. Thus, evidently, more advantageous results in the excavation and transportation of material are attainable.

The apron or guide plate 56 is of sufficient length to guide the scraper to deliver its load onto the conveyer when the boom is at any of several different positions to which it may be swung, by revolving the platform, during the operation of scraping or dragging the material from the ground or other support. See Fig. 4. The drag scraper is manipulated to dig or drag material from below the elevation of the conveyer and elevate the material and load it upon the conveyer, by the performance of a scraping or dragging operation over the ground or other means supporting the material. In the arrangement as illustrated and described, the loading of the material upon the conveyer is accomplished at location below the boom and adjacent a tractor supporting said boom. The cable or drag line can be freely swung in any necessary direction. That is, there is no interference in the machine with usual drag line operation. Obviously, the loading of the material may contemplate the delivery of the material to a hopper or other stationary member within the limits of the invention.

The scraping or dragging operation is performed by direct pull-in of the scraping or dragging entity, and thus the load is required to be hauled a minimum distance. Inasmuch as the load is scraped or dragged, and not forcibly lifted off of or away from the ground, or other means supporting the load, the hauling-in operation is accomplished in quite easy fashion with much less strain on a drag line cable than is the case where an equal load is forcibly lifted from the ground, or equivalent support. Because of the fact that the load is required to be hauled but a minimum distance by the scraping or dragging entity, shorter drag line cable can be employed, and because of the fact that the hauling-in operation is accomplished with considerably less strain on drag line cable than is encountered when lifting an equal load bodily off of the ground or other supporting means for the load, the novel and improved arrangement of the application tends toward elimination of wear on the drag line cable utilized. A substantial saving in drag line cable cost is thus effected. As a matter of fact, with the arrangement as illustrated and described, the size of drag line cable can be materially reduced, when considered with respect to the size of drag line cable customarily employed when the load is bodily lifted from the ground or other natural support for the load, and, at the same time, the scraping or dragging entity can in operation haul in a heavier load than is practical when operating with buckets of closed bottom type and lifting the load off of the ground or other support to be dumped. By reason of the fact that the machine of the application accomplishes the excavation, moving or handling of the material and the loading of the removed material by the performance of a scraping or dragging operation, and without lifting the material off of the ground or other entity supporting the material, it is capable of doing a given excavating or material handling job by the expenditure of considerably less effort than would be required of a machine designed to bodily lift and dump each load in the accomplishment of said excavating or material handling job. Or, stated differently, the machine of the application will remove and deposit a given amount of material by the performance of considerably less work than would be required of a machine equipped to bodily lift and dump each load to remove and deposit this same amount of material. A tremendous amount of energy is obviously expended in bodily lifting each load to position over the dumping location for the load, as is required when excavating with a closed bottom bucket and bodily lifting and dumping the load.

What is claimed is:

1. In a machine of the character described, a conveyer for transporting material, an excavating entity, a support upon said excavating entity, means mounting said conveyer on said support for sidewise swinging movement of the conveyer on a longitudinal axis, and vertically adjustable means for levelling said conveyer.

2. A combination excavator and loader, comprising a material dragging entity, means for receiving material, and means for swinging said dragging entity sidewise and for manipulating the dragging entity to cause it to remove material from supported position at different locations at a side of and along the length of said receiving means by a scraping operation and to deposit the removed material upon the receiving means along different substantially spaced portions of its length by a continuation of said scraping operation.

3. A combination excavator, loader and conveyer, comprising an excavator including a dragging entity and means for manipulating said dragging entity to remove material from the ground or other support, and a conveyer including means arranged parallel with said ground or other support for transporting said material, said means for manipulating said dragging entity being adapted to cause it to both remove material from the ground or other support and load the material upon said conveyer along different substantially spaced apart portions of the length thereof by the performance of a scraping operation.

4. A combination excavator and loader, comprising a material dragging entity, means for receiving material and means for swinging said dragging entity sidewise and for manipulating the dragging entity to cause it to both remove material from supported position at different locations at a side of and along the length of and below the elevation of said material receiving means and elevate said material by the performance of a scraping operation, said last mentioned means being adapted to cause said dragging entity to load said removed and elevated material upon said material receiving means along substantially spaced apart portions of the length thereof by a continuation of said scraping operation.

5. A combination excavator and loader, comprising a material dragging entity, means for receiving material, and means including a boom and drag line cable for manipulating said dragging entity to cause it to remove material from position at elevation below said material receiving means and elevate the material in direction toward said material receiving means by the performance of a scraping operation over a supporting surface for the material arranged parallel with said material receiving means, said means for manipulating said dragging entity being adapted to cause said removed and elevated material to be loaded upon said material receiving means along portions of the length thereof spaced at substantial distance apart by a continuation of said scraping operation.

6. A combination excavator and loader, comprising a material dragging entity, means for receiving material, means including a boom and drag line cable for manipulating said dragging entity, and means for swinging said boom transversely, said manipulating means for said dragging entity being adapted to cause it to remove material from position at a side of and along the length of and at elevation below said material receiving means and elevate the material in direction toward said material receiving means by the performance of a scraping operation over a supporting surface for the material arranged lengthwise of said material receiving means, and said means for manipulating said dragging entity being adapted to cause said removed and elevated material to be loaded upon said material receiving means along portions of the length thereof spaced at substantial distance apart by a continuation of said scraping operation.

7. A combination excavator, loader and conveyer, comprising a material dragging entity, means for transporting material, and means including a boom and drag line cable for manipulating said dragging entity at a side of the length of said material transporting means to cause said dragging entity to remove material from position at location below said transporting means, elevate the material in direction toward said transporting means and the inner end of the boom and load the removed and elevated material upon said transporting means along portions of the length thereof spaced at substantial distance apart by a scraping operation dragging the material out of the ground and onto said transporting means over a supporting surface for the material.

8. A combination excavator and loader, comprising a material dragging entity, means for receiving material, a guide for the material arranged at a side of said material receiving means and leading thereto, and means for manipulating said dragging entity to cause it to drag material from a supporting surface such as the ground, elevate the material toward said material receiving means and along selected and different portions of the length of said guide for the material and load the dragged and elevated material upon selected and different portions along the length of said material receiving means by the performance of a continuous scraping operation over said supporting surface and said material guide.

9. A combination excavator, loader and conveyer, comprising a material dragging entity, means for transporting material, a guide for the material leading to said material transporting means, and means including a boom and drag line cable for manipulating said dragging entity, said means for transporting material being situated below a portion of said boom, said material guide being at a side of said transporting means and extending longitudinally thereof and outwardly and downwardly therefrom, and said means for manipulating said dragging entity being adapted to actuate the dragging entity to drag material from a supporting surface such as the ground, elevate the material in direction toward said transporting means and the inner end of the boom and load the dragged and elevated material upon said transporting means at several different spaced apart locations along the length thereof by a scraping operation dragging the material from and along said supporting surface and along said material guide and onto said transporting means.

10. A combination excavator and loader, comprising a drag scraper, means including a boom and drag line cable for pulling in said drag scraper to remove material from a supporting surface for the material by a scraping operation over said supporting surface, and means arranged adjacent an inner part of the boom for receiving the removed material, said means for pulling in said drag scraper being adapted to elevate the removed material and load it upon said material receiving means at several substantially spaced apart locations along the length thereof by a continuation of said scraping operation.

11. A combination excavator and loader, comprising a drag scraper, means including a boom and drag line cable for pulling in said drag scraper to remove material from a supporting surface such as the ground and to elevate the material by a scraping operation over said supporting surface, means extending transversely of the boom and arranged adjacent an inner part thereof for receiving the removed and elevated material, and a material guiding member for said receiving means extending downwardly from a side thereof and in direction toward an outer part of the boom, said means for pulling in said drag scraper being adapted to drag the removed and elevated material over several different substantially spaced apart locations along the length of said material guiding member and deposit said material upon said material receiving means at several different substantially spaced apart locations along the length thereof by a continuation of said scraping operation.

12. A combination excavator, loader and conveyer comprising a shiftable boom, a scraping entity, means supported by said boom for manipulating said scraping entity, material transporting means situated beneath the boom and extending transversely thereof, and a material guiding member at a side of said transporting means and extending longitudinally thereof and in direction toward an outer portion of the boom, said means for manipulating said scraping entity being adapted to cause the scraping entity to remove material from the ground, elevate said material and load it upon said transporting means at several different selected locations along the length of the transporting means by the performance of a scraping operation, first over the ground and later over a selected portion along the length of said material guiding member.

13. A combination excavator and loader, comprising a shiftable boom, a scraping entity, means supported by said boom for manipulating said scraping entity, material receiving means situated beneath the boom and extending transversely thereof, and a material guiding member at a side of said material receiving means and extending longitudinally thereof and in direction toward an outer portion of the boom, said means for manipulating said scraping entity being adapted to cause the scraping entity to remove material from the ground at different locations at a side of said material guiding member and along the length thereof, elevate said material and deliver it to said receiving means at several different locations along the length of the receiving means by the performance of a scraping operation, first over the ground and later over a selected portion along the length of said material guiding member.

14. A combination excavator and loader, comprising a material dragging entity, means for receiving material, means including a boom and drag line cable for manipulating said dragging entity, and means for swinging said boom transversely, said manipulating means for said dragging entity and said means for swinging said boom transversely being adapted to cooperatively cause the dragging entity to remove material from position at a side of and along the length of and at elevation below said material receiving means and elevate the material in direction toward the material receiving means by the performance of a scraping operation over a supporting surface for the material arranged adjacent the material receiving means, and said manipulating means for said dragging entity and said means for swinging said boom transversely being adapted to cooperatively cause the dragging entity to deposit said removed and elevated material upon said material receiving means along different portions of the length thereof by a continuation of said scraping operation.

15. A combination excavator and loader, comprising a material dragging entity, means for receiving material, means including a boom and drag line cable for manipulating said dragging entity, a support oscillatably carrying said boom for movement in a horizontal plane, and means for swinging said boom transversely upon its support, said material receiving means being situated below an intermediate portion of said boom and said support oscillatably carrying the boom being situated at the inner side of the material receiving means and said manipulating means for the dragging entity being adapted to cooperate with said means for swinging said boom transversely to cause the dragging entity to remove material from position at the outer side of and along the length of and at elevation below said material receiving means, elevate the material in direction toward the material receiving means by the performance of a scraping operation over a supporting surface for the material situated at the outer side of the material receiving means, and deposit the removed and elevated material upon said material receiving means along different portions of the length thereof by a continuation of said scraping operation.

16. A combination excavator and loader, comprising a material dragging entity, an elongated means for receiving material, and a plurality of cooperating means for manipulating said dragging entity to cause it to remove material from supported position at different locations adjacent to and along the length of said receiving means by a scraping operation and to deposit the removed material to the receiving means along different substantially spaced apart portions of its length by a continuation of said scraping operation.

17. A combination excavator and loader, comprising a material dragging entity, an elongated means for receiving material, means for adjustably positioning said dragging entity for movement in any selected one of a plurality of different lines of travel disposed along the length of and transversely to said material receiving means, and means cooperating with said means for adjustably positioning the dragging entity for movement in any selected one of said different lines of travel for causing said dragging entity to remove material from supported position at different locations adjacent to and along the length of said receiving means by scraping operations and to deposit the removed material to the receiving means along different portions of its length by continuations of said scraping operations, said cooperating means being capable of operation while said dragging entity is positioned for movement in any selected one of the different lines of travel the dragging entity is capable of following, and the particular location at which material is removed from supported position and the particular location at which material is deposited to the receiving means being predetermined by a corresponding adjusted position of the dragging entity.

18. A combination excavator and loader, comprising a vehicle, a material dragging entity, means for receiving material at an end of said vehicle and carried thereby, said material receiving means extending in transverse relation to the direction of travel of said vehicle, and means for manipulating said dragging entity to cause it to remove material from supported position at different locations at a side of and along the length of said receiving means by a scraping operation and to deposit the removed material upon said receiving means along different substantially spaced apart portions of its length by a continuation of said scraping operation.

19. A combination excavator, loader and conveyer, comprising a vehicle, a material dragging entity, means for receiving and transporting material at an end of said vehicle and carried thereby, said material receiving and transporting means extending in transverse relation to the direction of travel of said vehicle, and means for manipulating said dragging entity to cause it to remove material from supported position at different locations at a side of and along the length of said receiving and transporting means by a scraping operation and to deposit the removed material upon said receiving and transporting means along different portions of its length spaced at substantial distance apart by a continuation of said scraping operation.

WALTER M. HOLLERBACH.